United States Patent
Lin et al.

(10) Patent No.: US 10,924,313 B2
(45) Date of Patent: *Feb. 16, 2021

(54) CODING SCHEME AND EXTENDED SYNCHRONIZATION ACCESS BURST FOR EC-GSM-IOT ENHANCEMENT

(71) Applicant: TELEFONAKTIEBOLAGET LM ERICSSON (PUBL), Stockholm (SE)

(72) Inventors: Zhipeng Lin, Nanjing (CN); John Walter Diachina, Garner, NC (US); Stefan Eriksson Löwenmark, Färentuna (SE); Nicklas Johansson, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,875

(22) Filed: Jan. 17, 2020

(65) Prior Publication Data

US 2020/0153671 A1 May 14, 2020

Related U.S. Application Data

(63) Continuation of application No. 15/937,554, filed on Mar. 27, 2018, now Pat. No. 10,574,496.

(60) Provisional application No. 62/477,106, filed on Mar. 27, 2017.

(51) Int. Cl.
| | |
|---|---|
| *H04W 24/02* | (2009.01) |
| *H04L 27/26* | (2006.01) |
| *H04L 1/00* | (2006.01) |
| *H04W 74/08* | (2009.01) |
| *H04W 56/00* | (2009.01) |
| *H04L 25/00* | (2006.01) |

(52) U.S. Cl.
CPC ........ *H04L 27/2613* (2013.01); *H04L 1/0059* (2013.01); *H04L 1/0069* (2013.01); *H04L 1/0072* (2013.01); *H04L 27/2605* (2013.01); *H04L 27/2692* (2013.01); *H04W 56/0015* (2013.01); *H04W 56/0045* (2013.01); *H04W 56/0085* (2013.01); *H04W 74/0833* (2013.01); *H04L 25/00* (2013.01)

(58) Field of Classification Search
CPC ......... H04W 56/0045; H04W 56/0015; H04W 56/0085; H04W 74/0833; H04L 1/18
See application file for complete search history.

(56) References Cited

U.S. PATENT DOCUMENTS

| | | |
|---|---|---|
| 2011/0222527 A1 | 9/2011 | Hole et al. |
| 2012/0155310 A1 | 6/2012 | Kreuzer et al. |
| 2015/0271665 A1 | 9/2015 | Löwenmark et al. |

(Continued)

OTHER PUBLICATIONS

Nokia et al., "New WID on Radio Interface Enhancements for EC-GSM-IoT", RP-161806, 3GPP TSG RAN Meeting #73, Sep. 19, 2016.

(Continued)

*Primary Examiner* — Lan-Huong Truong

(57) ABSTRACT

A wireless device, a Radio Access Network (RAN) node, and various methods are described herein for improving the coverage performance of the Extended Coverage (EC)-Random Access Channel (RACH). For instance, the wireless device, the RAN node, and various methods can improve the coverage performance of the EC-RACH by utilizing a new access burst (referred to herein as Extended Synchronization Access Burst (ESAB)), a new coding scheme (referred to herein as RACH11') for the CC5 2TS EC-RACH, and/or an access burst mapping scheme for the CC5 2TS EC-RACH.

20 Claims, 7 Drawing Sheets

1000

1002 — ATTEMPT SYSTEM ACCESS BY TRANSMITTING A SYSTEM ACCESS MESSAGE ON EC-RACH USING REPEATED ESABs, WHEREIN EACH ESAB INCLUDES 102 ENCRYPTED DATA BITS CODED ACCORDING TO AN 11-BIT RACH CODING SCHEME

(56) References Cited

U.S. PATENT DOCUMENTS

2016/0157251 A1   6/2016  Schliwa-Bertling et al.
2016/0302234 A1   10/2016 Martinez Tarradell et al.

OTHER PUBLICATIONS

Nokia, "UL MCL Improvement for Low Power Devices in EC-GSM-IoT—Concept Overview", R6-160193, 3GPP TSG RAN WG6 #2, Nov. 14, 2016.
Nokia, "UL MCL Improvement for Low Power Devices in EC-GSM-IoT—Performance Evaluation", R6-160176, 3GPP TSG RAN WG6 #2, Nov. 14, 2016.
Ericsson LM, "Radio interface enhancements for EC-GSM-IoT—New access burst formats", R6-160159, 3GPP TSG RAN6#2, Nov. 14, 2016.
"GSM/EDGE Multiplexing and multiple access on the radio path" 3GPP Technical Specification (TS) 45.002 V.13.5.0, Mar. 2017.
3rd Generation Partnership Project; Technical Specification Group Radio Access Network; GSM/EDGE Multiplexing and multiple access on the radio path (Release 13), 3GPP TS 45.003 V.14.1.0 Mar. 2017.
Ericsson: "Radio interface enhancements for EC-GSM-IoT—New coding scheme RACH11' and extended synchronization access burst for EC-RACH CC5", 3GPP TSG RAN WG6 #4, Hangzhou, China, May 15-19, 2017, section 1, section 3.1, section 3.2, section 3.3.
Nokia: "UL MCL Improvement for Low Power Devices in EC-GSM-IOT—Concept Overview (Update of R6-160247)", R6-160267, 3GPP TSG RAN WG6 #2, Reno, Nevada, USA, Nov. 14-18, 2016, Section 4.

CODING SCHEME AND EXTENDED SYNCHRONIZATION ACCESS BURST FOR EC-GSM-IOT ENHANCEMENT

CLAIM OF PRIORITY

This application is a Continuation of U.S. patent application Ser. No. 15/937,554 filed on Mar. 27, 2018, which claims the benefit of priority to U.S. Provisional Application Ser. No. 62/477,106, and to International Application No. PCT/CN2017/078266, both filed on Mar. 27, 2017; the entire contents of each of these documents are hereby incorporated by reference herein for all purposes.

TECHNICAL FIELD

The present disclosure relates generally to the wireless telecommunications field and, more particularly, to a wireless device, a Radio Access Network (RAN) node, and various methods for improving the coverage performance of the Extended Coverage (EC)-Random Access Channel (RACH).

BACKGROUND

The following abbreviations and terms are herewith defined, at least some of which are referred to within the following description of the present disclosure.
3GPP 3rd-Generation Partnership Project
AB Access Burst
AGCH Access Grant Channel
ASIC Application Specific Integrated Circuit
BLER Block Error Rate
BSS Base Station Subsystem
BTS Base Transceiver Station
CC Coverage Class
CN Core Network
EC Extended Coverage
EC-GSM Extended Coverage Global System for Mobile Communications
EC-PACCH Extended Coverage Packet Associated Control Channel
EC-PDTCH Extended Coverage Packet Data Traffic Channel
EC-RACH Extended Coverage Random Access Channel
eNB Evolved Node B
EDGE Enhanced Data rates for GSM Evolution
EGPRS Enhanced General Packet Radio Service
ESAB Extended Synchronization Access Burst
E-UTRA Evolved Universal Terrestrial Radio Access
FN TDMA Frame Number in GSM
GSM Global System for Mobile Communications
GERAN GSM/EDGE Radio Access Network
GPRS General Packet Radio Service
HARQ Hybrid Automatic Repeat Request
IoT Internet of Things
IQ In-phase/Quadrature
LTE Long-Term Evolution
MCL Maximum Coupling Loss
MCS Modulation and Coding Scheme
MF Multi-Frame
MME Mobility Management Entity
MS Mobile Station
MTC Machine Type Communications
NB Node B
PACCH Packet Associated Control Channel
PDCH Packet Data Channel
PDN Packet Data Network
PDTCH Packet Data Traffic Channel
RACH Random Access Channel
RACH11 11 bit RACH coding scheme for legacy RACH and EC-RACH CC1/2/3/4
RACH11' 11 bit RACH coding scheme for CC5 2TS EC-RACH
RAN Radio Access Network
RAT Radio Access Technology
SGSN Serving GPRS Support Node
TDMA Time Division Multiple Access
TS Time Slot
TSC Training Sequence Code
TSG Technical Specification Group
UE User Equipment
UL Uplink
WCDMA Wideband Code Division Multiple Access
WiMAX Worldwide Interoperability for Microwave Access Coverage Class (CC): At any point in time a wireless device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a wireless device determines the uplink/downlink coverage class applicable to the RACH/AGCH based on estimating the number of blind transmissions of a radio block needed by the BSS (radio access network node) receiver/wireless device receiver to experience a BLER (block error rate) of approximately 10%. The BSS determines the uplink/downlink coverage class to be used by a wireless device on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a wireless device operating with radio interface performance attributes corresponding to the reference coverage (normal coverage) is considered to be in the best coverage class (i.e., coverage class 1) and therefore does not make any additional blind transmissions subsequent to an initial blind transmission. In this case, the wireless device may be referred to as a normal coverage wireless device. In contrast, a wireless device operating with radio interface performance attributes corresponding to an extended coverage (i.e., coverage class greater than 1) makes multiple blind transmissions. In this case, the wireless device may be referred to as an extended coverage wireless device. Multiple blind transmissions corresponds to the case where N instances of a radio block are transmitted consecutively using the applicable radio resources (e.g., the paging channel) without any attempt by the transmitting end to determine if the receiving end is able to successfully recover the radio block prior to all N transmissions. The transmitting end does this in attempt to help the receiving end realize a target BLER performance (e.g., target BLER≤10% for the paging channel).

Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

MTC device: A MTC device is a type of device where support for human interaction with the device is typically not required and data transmissions from or to the device are expected to be rather short (e.g., a maximum of a few hundred octets). MTC devices supporting a minimum functionality can be expected to only operate using normal cell contours and as such do not support the concept of extended coverage whereas MTC devices with enhanced capabilities may support extended coverage.

At the 3rd-Generation Partnership Project (3GPP) Technical Specification Group (TSG) Radio Access Network (RAN) Meeting #73, a Work Item (WI) on "Radio Interface Enhancements for EC-GSM-IoT" was approved (see RP-161806 entitled "New WID on Radio Interface Enhancements for EC-GSM-IoT"; Source: Nokia, Alcatel-Lucent Shanghai Bell, ORANGE, Ericsson L M, Sierra Wireless S. A., MediaTek Inc.; New Orleans, U.S.A.; 19 22 Sep. 2016 (hereinafter "RP-161806") the entire contents of this document are hereby incorporated herein by reference for all purposes). One of the WI objectives was:

Maximum Coupling Loss (MCL) improvement targeting at least 3 dB for low power devices (i.e., 23 dBm) on all uplink channels.

It is further stated that the following would be considered:

New coverage class (CC) for uplink channels to improve the coverage performance of low power devices including at least:
  design of new channel coding schemes for the EC-PDTCH and EC-PACCH uplink channels with increased number of blind physical layer transmissions with allocation in 2 and 4 consecutive PDCHs.
  definition of an increased number of blind physical layer transmissions for 2TS EC-RACH, investigation on modified channel coding and alternative burst types with predefined longer synchronization sequences for improved coverage performance for the EC-RACH channel.

The following is a discussion about the state-of-the-art involving a Coverage Class 4 (CC4) 2TS EC-RACH which uses a legacy access burst 100 (AB 100) configured as illustrated in FIG. 1 (PRIOR ART). As shown, the legacy access burst 100 consists of 8+3 tail bits 102, 41 synchronization bits 104, 36 payload bits 106 (36 encrypted payload bits 106), and a guard period of length 68 bits 108. The legacy access burst 100 uses 48 blind physical layer transmissions over 1 or 2 time slots (TSs) to achieve the Maximum Coupling Loss (MCL) performance target defined in Release 13 (R13) of 3GPP Technical Specification (TS) 45.002 V.13.5.0 (Mar. 20, 2017) entitled "GSM/EDGE Multiplexing and multiple access on the radio path" (hereinafter "3GPP TS 45.002") (the entire contents of this document are hereby incorporated by reference herein for all purposes).

The 36 encrypted payload bits 106 of the legacy access burst 100 are generated by using a coding scheme (known as RACH11) designed for CC4 2TS EC-RACH which is shown below in TABLE 1.

TABLE 1

| Channel coding design for CC4 2TS EC-RACH | |
|---|---|
| Payload bits | 11 bits |
| Parity | 6 bits |
| Convolution coding | 1/3 convolutional coding |
| Number of data bits after channel coding and puncturing | 36 bits |

In an attempt to improve the performance of the above-described CC4 2TS EC-RACH, several papers have been published including: (1) R6-160159 entitled "Radio interface enhancements for EC-GSM-IoT New access burst formats", source Ericsson LM, 3GPP TSG RAN Working Group (WG) 6 Meeting #2; Reno, Nev., U.S.A.; 14-18 Nov. 2016 (hereinafter "R6-160159"); (2) R6-160193 entitled "UL MCL Improvement for Low Power Devices in EC-GSM-IoT—Concept Overview", source Nokia, 3GPP TSG RAN WG6 Meeting #2; Reno, Nev., U.S.A.; 14-18 Nov. 2016 (hereinafter "R6-160193"); and (3) R6-160176 entitled "UL MCL Improvement for Low Power Devices in EC-GSM-IoT Performance Evaluation", source Nokia, 3GPP TSG RAN WG6 Meeting #2; Reno, Nev., U.S.A.; 14-18 Nov. 2016 (hereinafter "R6-160176") (the entire contents of these three documents are hereby incorporated by reference herein for all purposes). The solutions presented in these papers for improving the performance of the CC4 2TS EC-RACH and the associated problems therewith are briefly discussed hereinafter.

Option 1:
  Only increase the number of blind physical layer transmissions
    As can be seen from FIG. 2 (PRIOR ART) which was disclosed in the aforementioned Technical Document (Tdoc) R6-160159 of the 3GPP TSG RAN WG6 Meeting #2, the processing gain was initially increased when the number of transmissions is increased. However, at a higher number of transmissions, the actual experienced processing gain deviates more and more from the ideal gain.

Option 2:
  Extend the length of the access burst sent using timeslots 0 and 1, thereby allowing for an increased number of synchronization sequence bits while also increasing the number of physical layer transmissions.
    As is discussed in Tdoc R6-160159 (see reference above), increasing the length of the burst will directly improve the phase shift estimation through an increased processing gain, and increasing the length of the synchronization sequence will improve the detection of the sync position of the burst, which is expected to improve the phase shift estimation and therefore the processing gain.

However, further simulation also showed that the experienced processing gain resulting from further increasing the number of synchronization sequence bits is limited above a certain synchronization sequence length.

Option 3: Extend the length of the access burst sent using timeslots 0 and 1, but repeat the data parts for the portion of the access burst sent on Time Slot 0 (TS0) while increasing the number of physical layer transmissions.

This solution has been described and evaluated in the aforementioned Tdoc R6-160193 and the aforementioned Tdoc R6-160176, both from the 3GPP TSG RAN WG6 Meeting #2. The drawback with this approach is that it increases the complexity of the signal accumulator in the receiver as well as creating, to some extent, interference to the CC4 2TS EC-RACH.

Moreover, there will also be multiple demodulation points at the demodulation positions for the proposed coverage class 5 (CC5) 2TS EC-RACH discussed in Tdoc R6-160193 (see reference above), which will require additional processing as well as local data memory for the signal processor in the receiver in a short time.

In addition, based on the simulations, the performance gain shown in Tdoc R6-160176 (see reference above) is limited to 4 dB when a total of 75 physical layer transmissions (150 bursts) is used, thus making it the limiting channel for the coverage enhancements targeted by RP-161806 (see reference above) for the EC-PDTCH, EC-PACCH and EC-RACH. Ideally, the number of physical layer transmissions should be kept as low as possible since it directly impacts the power consumption.

Finally, the length of information data bits in Tdoc R6-160193 (see reference above) is reduced from 11 bits (EC-RACH CC4) to 10 bits, which means that no extra bits are available for future use.

As can be seen there is still a need to address the problems associated with the state-of-the-art approaches in order to improve the coverage performance of the EC-RACH. The present disclosure addresses these problems while improving the coverage performance of the EC-RACH.

SUMMARY

A wireless device, a RAN node, and various methods for addressing the aforementioned problems are described in the independent claims. Advantageous embodiments of the wireless device, the RAN node, and the various methods are further described in the dependent claims.

In one aspect, the present disclosure provides a wireless device configured to communicate with a RAN node. The wireless device comprises a processor and a memory that stores processor-executable instructions, wherein the processor interfaces with the memory to execute the processor-executable instructions, whereby the wireless device is operable to perform a system access attempt operation. In the system access attempt operation, the wireless device attempts a system access using an EC-RACH by transmitting, to the RAN node, a system access message on the EC-RACH using repeated ESABs, wherein each ESAB is extended over 2 timeslots on the EC-RACH, and wherein each ESAB comprises 140 synchronization bits, 102 encrypted data bits, 3 tail bits, and 68 guard symbols. An advantage of the wireless device performing this operation is an improved coverage performance of the EC-RACH.

In another aspect, the present disclosure provides a method implemented by a wireless device configured to communicate with a RAN node. The method comprises a system access attempt step. In the system access attempt step, the wireless device attempts a system access using an EC-RACH by transmitting, to the RAN node, a system access message on the EC-RACH using repeated ESABs, wherein each ESAB is extended over 2 timeslots on the EC-RACH, and wherein each ESAB comprises 140 synchronization bits, 102 encrypted data bits, 3 tail bits, and 68 guard symbols. An advantage of the wireless device performing this step is an improved coverage performance of the EC-RACH.

In yet another aspect, the present disclosure provides a RAN node configured to interact with a wireless device. The RAN node comprises a processor and a memory that stores processor-executable instructions, wherein the processor interfaces with the memory to execute the processor-executable instructions, whereby the RAN node is operable to perform a receive operation. In the receive operation, the RAN node receives, from the wireless device, a system access message on an EC-RACH, wherein the system access message comprises repeated ESABs, wherein each ESAB is extended over 2 timeslots on the EC-RACH, and wherein each ESAB comprises 140 synchronization bits, 102 encrypted data bits, 3 tail bits, and 68 guard symbols. An advantage of the RAN node performing this operation is an improved coverage performance of the EC-RACH.

In yet another aspect, the present disclosure provides a method implemented by a RAN node configured to interact with a wireless device. The method comprises a receiving step. In the receiving step, the RAN node receives, from the wireless device, a system access message on an EC-RACH, wherein the system access message comprises repeated ESABs, wherein each ESAB is extended over 2 timeslots on the EC-RACH, and wherein each ESAB comprises 140 synchronization bits, 102 encrypted data bits, 3 tail bits, and 68 guard symbols. An advantage of the RAN node performing this step is an improved coverage performance of the EC-RACH.

In yet another aspect, the present disclosure provides a wireless device configured to communicate with a RAN node. The wireless device comprises a processor and a memory that stores processor-executable instructions, wherein the processor interfaces with the memory to execute the processor-executable instructions, whereby the wireless device is operable to perform a system access attempt operation. In the system access attempt operation, the wireless device attempts a system access using an EC-RACH by transmitting, to the RAN node, a system access message on the EC-RACH using repeated ESABs, wherein each ESAB includes 102 encrypted data bits coded according to an 11-bit RACH coding scheme, and wherein the 11-bit RACH coding scheme utilizes 11 payload bits and 6 parity bits to which a rate 1/6 tail biting convolutional coding is applied, resulting in the 102 encrypted data bits after channel coding. An advantage of the wireless device performing this operation is an improved coverage performance of the EC-RACH.

In yet another aspect, the present disclosure provides a method implemented by a wireless device configured to communicate with a RAN node. The method comprises a system access attempt step. In the system access attempt step, the wireless device attempts a system access using an EC-RACH by transmitting, to the RAN node, a system access message on the EC-RACH using repeated ESABs, wherein each ESAB includes 102 encrypted data bits coded according to an 11-bit RACH coding scheme, and wherein the 11-bit RACH coding scheme utilizes 11 payload bits and 6 parity bits to which a rate 1/6 tail biting convolutional coding is applied, resulting in the 102 encrypted data bits after channel coding. An advantage of the wireless device performing this step is an improved coverage performance of the EC-RACH.

In yet another aspect, the present disclosure provides a RAN node configured to interact with a wireless device. The RAN node comprises a processor and a memory that stores processor-executable instructions, wherein the processor interfaces with the memory to execute the processor-executable instructions, whereby the RAN node is operable to perform a receive operation. In the receive operation, the RAN node receives, from the wireless device, a system access message on an EC-RACH having repeated ESABs, wherein each ESAB includes 102 encrypted data bits coded according to an 11-bit RACH coding scheme which utilized 11 payload bits and 6 parity bits to which a rate 1/6 tail biting convolutional coding was applied, resulting in the 102 encrypted data bits after channel coding. An advantage of the RAN node performing this operation is an improved coverage performance of the EC-RACH.

In yet another aspect, the present disclosure provides a method implemented by a RAN node configured to interact with a wireless device. The method comprises a receiving step. In the receiving step, the RAN node receives, from the wireless device, a system access message on an EC-RACH having repeated ESABs, wherein each ESAB includes 102 encrypted data bits coded according to an 11-bit RACH coding scheme which utilized 11 payload bits and 6 parity bits to which a rate 1/6 tail biting convolutional coding was applied, resulting in the 102 encrypted data bits after channel coding. An advantage of the RAN node performing this step is an improved coverage performance of the EC-RACH.

In yet another aspect, the present disclosure provides a wireless device configured to communicate with a RAN node. The wireless device comprises a processor and a memory that stores processor-executable instructions, wherein the processor interfaces with the memory to execute the processor-executable instructions, whereby the wireless device is operable to perform a system access attempt operation. In the system access attempt operation, the wireless device attempts a system access using an EC-RACH by transmitting, to the RAN node, a system access message which has repeated ESABs on the EC-RACH, wherein the transmitting of the system access message on the EC-RACH is performed when the EC-RACH is in a 2TS and CC5 operation and involves transmitting 22 repeated ESABs over three consecutive 51-Multi-Frames (MFs) for a total of 66 repeated ESABs. An advantage of the wireless device performing this operation is an improved coverage performance of the EC-RACH.

In yet another aspect, the present disclosure provides a method implemented by a wireless device configured to communicate with a RAN node. The method comprises a system access attempt step. In the system access attempt step, the wireless device attempts a system access using an EC-RACH by transmitting, to the RAN node, a system access message which has repeated ESABs on the EC-RACH, wherein the transmitting of the system access message on the EC-RACH is performed when the EC-RACH is in a 2TS and CC5 operation and involves transmitting 22 repeated ESABs over three consecutive 51-Multi-Frames (MFs) for a total of 66 repeated ESABs. An advantage of the wireless device performing this step is an improved coverage performance of the EC-RACH.

In yet another aspect, the present disclosure provides a RAN node configured to interact with a wireless device. The RAN node comprises a processor and a memory that stores processor-executable instructions, wherein the processor interfaces with the memory to execute the processor-executable instructions, whereby the RAN node is operable to perform a receive operation. In the receive operation, the RAN node receives, from the wireless device, a system access message which has repeated ESABs on an EC-RACH, wherein the receiving of the system access message on the EC-RACH is performed when the EC-RACH is in a 2TS and CC5 operation and involves receiving 22 repeated ESABs over three consecutive 51-Multi-Frames (MFs) for a total of 66 repeated ESABs. An advantage of the RAN node performing this operation is an improved coverage performance of the EC-RACH.

In yet another aspect, the present disclosure provides a method implemented by a RAN node configured to interact with a wireless device. The method comprises a receiving step. In the receiving step, the RAN node receives, from the wireless device, a system access message which has repeated ESABs on an EC-RACH, wherein the receiving of the system access message on the EC-RACH is performed when the EC-RACH is in a 2TS and CC5 operation and involves receiving 22 repeated ESABs over three consecutive 51-Multi-Frames (MFs) for a total of 66 repeated ESABs. An advantage of the RAN node performing this step is an improved coverage performance of the EC-RACH.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 3:
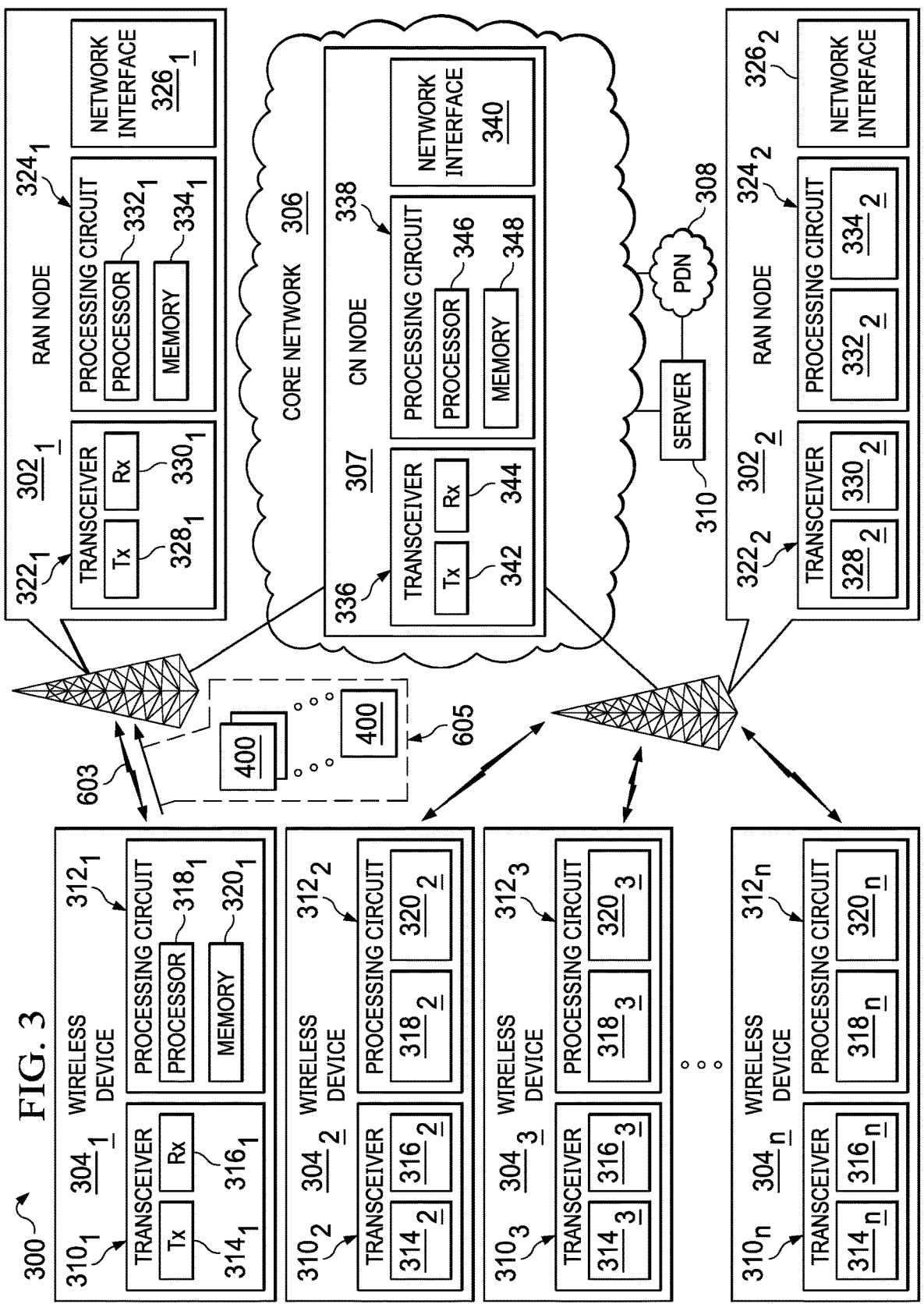
FIG. 3 is a diagram of an exemplary wireless communication network which includes a CN node, multiple RAN nodes, and multiple wireless devices configured in accordance with an embodiment of the present disclosure.

A discussion is first provided herein to describe an exemplary wireless communication network that includes a CN node (e.g., SGSN), multiple RAN nodes (e.g., BSSs), and multiple wireless devices (e.g., EC-GSM wireless devices) which are configured in accordance with different embodiments of the present disclosure (see FIG. 3). Then, a discussion is provided to disclose how the wireless devices (e.g., EC-GSM wireless devices) and the RAN nodes (e.g., BSSs) improve the coverage performance of the EC-RACH in accordance with various embodiments of the present disclosure (see FIGS. 4-5). Thereafter, a discussion is provided to explain the basic functionalities-configurations of the wireless devices (e.g., EC-GSM wireless devices) and the RAN nodes (e.g., BSSs) in accordance with different embodiments of the present disclosure (see FIGS. 6-17).

Exemplary Wireless Communication Network 300

Referring to FIG. 3, there is illustrated an exemplary wireless communication network 300 in accordance with the present disclosure. The wireless communication network 300 includes a core network 306 (which comprises at least one CN node 307) and multiple RAN nodes $302_1$ and $302_2$ (only two shown) which interface with multiple wireless devices $304_1$, $304_2$, $304_3$ . . . $304_n$. The wireless communication network 300 also includes many well-known components, but for clarity, only the components needed to describe the features of the present disclosure are described herein. Further, the wireless communication network 300 is described herein as being a GSM/EGPRS wireless communication network 300 which is also known as an EDGE wireless communication network 300. However, those skilled in the art will readily appreciate that the techniques of the present disclosure which are applied to the GSM/EGPRS wireless communication network 300 are generally applicable to other types of wireless communication systems, including, for example, WCDMA, LTE, and WiMAX systems.

The wireless communication network 300 includes the RAN nodes $302_1$ and $302_2$ (wireless access nodes—only two shown) which provide network access to the wireless devices $304_1$, $304_2$, $304_3$ . . . $304_n$. In this example, the RAN node $302_1$ is providing network access to wireless device $304_1$ while the RAN node $302_2$ is providing network access to wireless devices $304_2$, $304_3$ . . . $304_n$. The RAN nodes $302_1$ and $302_2$ are connected to the core network 306 (e.g., SGSN core network 306) and, in particular, to the CN node 307 (e.g., SGSN 307). The core network 306 is connected to an external packet data network (PDN) 308, such as the Internet, and a server 310 (only one shown). The wireless devices $304_1$, $304_2$, $304_3$ . . . $304_n$ may communicate with one or more servers 310 (only one shown) connected to the core network 306 and/or the PDN 308.

The wireless devices $304_1$, $304_2$, $304_3$ . . . $304_n$ may refer generally to an end terminal (user) that attaches to the wireless communication network 300, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $302_1$ and $302_2$ (wireless access node $302_1$ and $302_2$) is used herein in the most general sense to refer to a base station, a wireless access node, or a wireless access point in a wireless communication network 300, and may refer to RAN nodes $302_1$ and $302_2$ that are controlled by a physically distinct radio network controller as well as to more autonomous access points, such as the so-called evolved Node Bs (eNodeBs) in Long-Term Evolution (LTE) networks.

Each wireless device $304_1$, $304_2$, $304_3$ . . . $304_n$ may include a transceiver circuit $310_1$, $310_2$, $310_3$ . . . $310_n$ for communicating with the RAN nodes $302_1$ and $302_2$, and a processing circuit $312_1$, $312_2$, $312_3$ . . . $312n$ for processing signals transmitted from and received by the transceiver circuit $310_1$, $310_2$, $310_3$ . . . $310_n$ and for controlling the operation of the corresponding wireless device $304_1$, $304_2$, $304_3$ . . . $304_n$. The transceiver circuit $310_1$, $310_2$, $310_3$ . . . $310n$ may include a transmitter $314_1$, $314_2$, $314_3$ . . . $314_n$ and a receiver $316_1$, $316_2$, $316_3$ . . . $316_n$, which may operate according to any standard, e.g., the GSM/EDGE standard. The processing circuit $312_1$, $312_2$, $312_3$ . . . $312_n$ may include a processor $318_1$, $318_2$, $318_3$ . . . $318_n$ and a memory $320_1$, $320_2$, $320_3$ . . . $320_n$ for storing program code for controlling the operation of the corresponding wireless device $304_1$, $304_2$, $304_3$ . . . $304_n$. The program code may include code for performing the procedures as described hereinafter.

Each RAN node $302_1$ and $302_2$ (wireless access node $302_1$ and $302_2$) may include a transceiver circuit $322_1$ and $322_2$ for communicating with wireless devices $304_1$, $304_2$, $304_3 \ldots 304_n$, a processing circuit $324_1$ and $324_2$ for processing signals transmitted from and received by the transceiver circuit $322_1$ and $322_2$ and for controlling the operation of the corresponding RAN node $302_1$ and $302_2$, and a network interface $326_1$ and $326_2$ for communicating with the core network 306. The transceiver circuit $322_1$ and $322_2$ may include a transmitter $328_1$ and $328_2$ and a receiver 3301 and 3302, which may operate according to any standard, e.g., the GSM/EDGE standard. The processing circuit $324_1$ and $324_2$ may include a processor $332_1$ and $332_2$, and a memory $334_1$ and $334_2$ for storing program code for controlling the operation of the corresponding RAN node $302_1$ and $302_2$. The program code may include code for performing the procedures as described hereinafter.

The CN node 307 (e.g., SGSN 307, MME 307) may include a transceiver circuit 336 for communicating with one or more RAN nodes, e.g., the RAN nodes $302_1$ and $302_2$, a processing circuit 338 for processing signals transmitted from and received by the transceiver circuit 336 and for controlling the operation of the CN node 307, and a network interface 340 for communicating with one or more RAN nodes, e.g., the RAN nodes $302_1$ and $302_2$. The transceiver circuit 336 may include a transmitter 342 and a receiver 344, which may operate according to any standard, e.g., the GSM/EDGE standard. The processing circuit 338 may include a processor 346 and a memory 348 for storing program code for controlling the operation of the CN node 307. The program code may include code for performing the procedures as described hereinafter.

Techniques for Improving the Coverage Performance of the EC-RACH

The present disclosure addresses the problems of the state-of-the-art approaches described above in the Background Section. More specifically, the present disclosure addresses the problems of the state-of-the-art approaches by providing various methods for improving the EC-RACH including (1) a new coding scheme for transmitting payload, parity bits, and an increased quantity of synchronization bits; (2) a new extended synchronization access burst (ESAB) to accommodate the new coding scheme and the increased quantity of synchronization bits; and (3) a new method for mapping the blind physical layer transmissions of the extended synchronization access burst (ESAB) onto timeslots 0 and 1 occurring within distinct subsets of Time Division Multiple Access (TDMA) frames within three consecutive 51-multiframes. The new ESAB, the new coding scheme (referred to herein as the RACH11'), and the new multi-frame mapping scheme are discussed in detail next.

Extended Synchronization Access Burst (ESAB)

Figure 1:
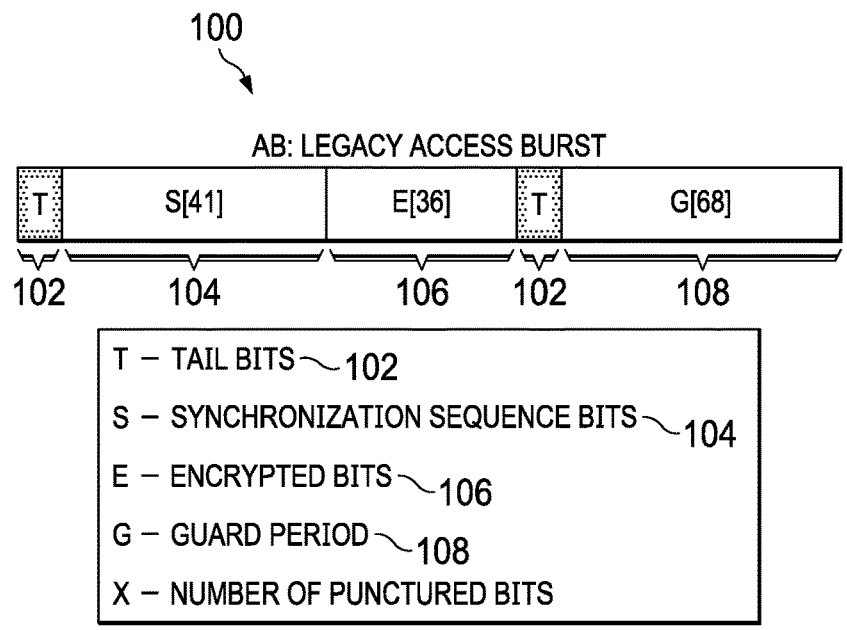
FIG. 1 (PRIOR ART) is a diagram illustrating a format of a legacy access burst (AB)
Figure 2:
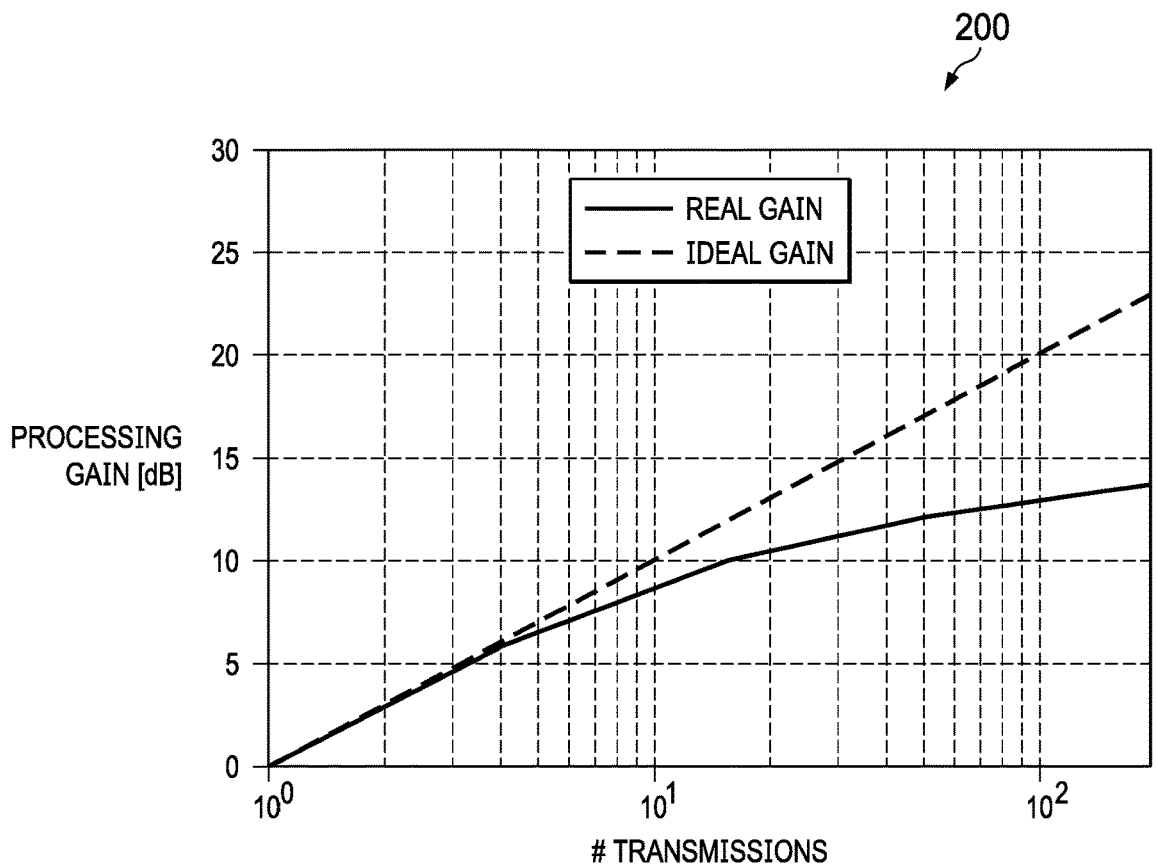
FIG. 2 (PRIOR ART) is a graph from Tdoc R6-160159 which illustrates that the actual experienced processing gain deviates more and more from an ideal processing gain with an increasing number of transmissions when attempting to improve the coverage performance based on CC4 2TS EC-RACH by only increasing the number of blind physical layer transmissions.
Figure 4:
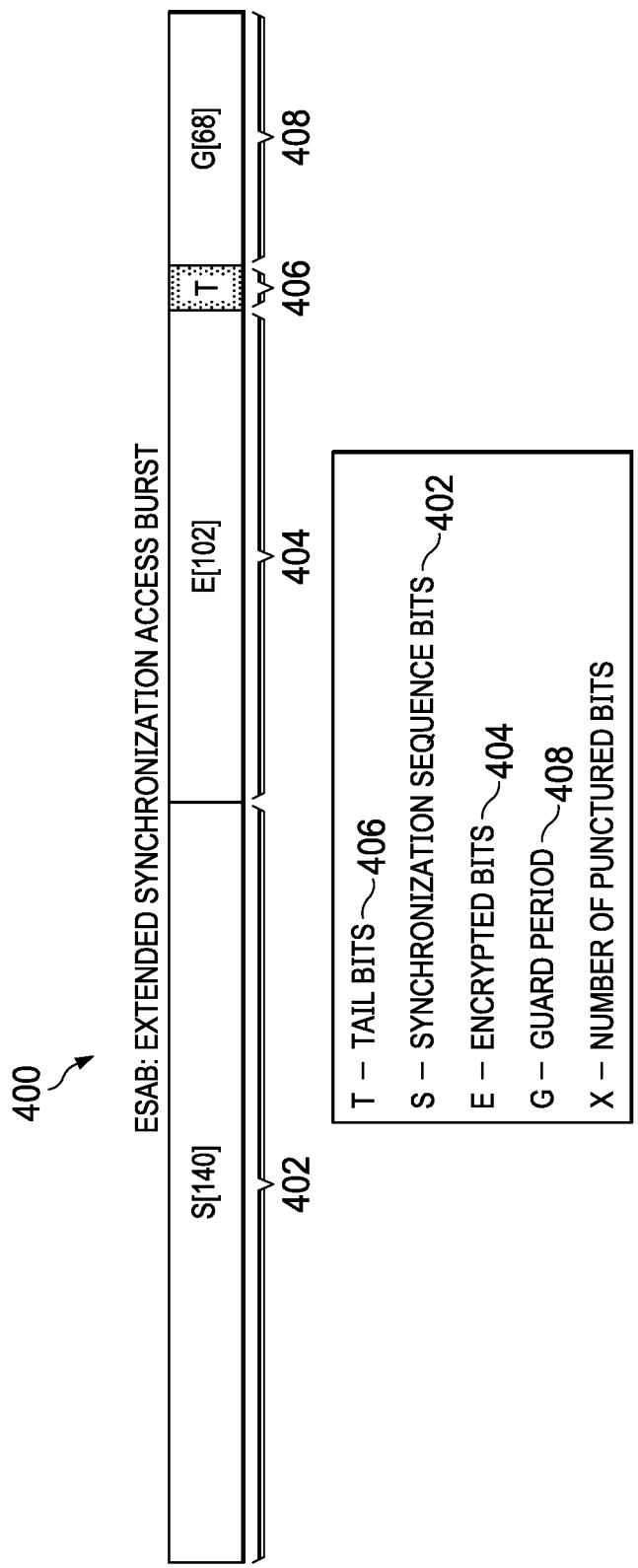
FIG. 4 is a diagram illustrating a format of an Extended Synchronization Access Burst (ESAB) in accordance with an embodiment of the present disclosure.

The new access burst format referred to hereafter as the Extended Synchronization Access Burst (ESAB) 400 is illustrated in FIG. 4 (note: the legacy access burst 100 is illustrated in FIG. 1 (PRIOR ART)). The ESAB 400 is extended over 2 timeslots (i.e., 157 symbols on Time Slot 0 (TS0) and 156 symbols on Time Slot 1 (TS1)), has 140 synchronization bits 402, 102 encrypted data bits 404, 3 tail bits 406, and 68 guard symbols 408.

In comparing the legacy access burst 100 to the ESAB 400 it can be seen that the ESAB 400 has both the length of encrypted data bits 404 (i.e., 102 encrypted data bits 404) increased as well as the length of the synchronization bits 402 (i.e., 140 synchronization bits 402) increased while keeping the same number of information bits (i.e., 11 information bits). The ESAB 400 effectively decreases the block error rate through a higher data coding rate of the data bits as well as increasing processing gain through better phase difference estimation for between-frame IQ accumulation and channel estimation. That is, the ESAB 400 is an improvement over the legacy access burst 100 and also effectively improves the coverage performance of the EC-RACH.

RACH 11': 11 bit RACH coding scheme for CC5 2TS EC-RACH

A new coding scheme implemented by the wireless device $304_1$ (for example) and designed for CC5 2TS EC-RACH is described below with reference to TABLE 2.

TABLE 2

| Channel coding design for CC5 2TS EC-RACH | |
|---|---|
| Payload bits | 11 bits |
| Parity | 6 bits |
| Convolution coding | 1/6 tail biting convolutional coding |
| Number of data bits after channel coding | 102 bits |

In one example, the ESAB 400 has a format coded according to the 11-bit RACH coding scheme designed for the CC5 2TS EC-RACH, and wherein the 11-bit RACH coding scheme includes 11 payload bits and 6 parity bits to which a rate 1/6 tail biting convolutional coding is applied resulting in 102 encrypted data bits 404 (see FIG. 4) after channel coding.

In some embodiments, the polynomials used for the rate 1/6 tail biting convolution coding are defined as below:

$G4=1+D2+D3+D5+D6$ $G4=1+D2+D3+D5+D6$ $G7=1+D+D2+D3+D6$ $G5=1+D+D4+D6$ $G6=1+D+D2+D3+D4+D6$ $G6=1+D+D2+D3+D4+D6$ wherein G is the output of the polynomial and D is the input of the formula (note: for the definitions of these terms refer to Annex B of 3GPP Technical Specification (TS) 45.003 V.14.1.0 (2017-03) entitled "GSM/EDGE Channel Coding" (Release 14) (the entire contents of this document are hereby incorporated by reference herein for all purposes). Note: the D2, D3, D4, D5, and D6 above and hereinafter are actually $D^2$, $D^3$, $D^4$, $D^5$, and $D^6$ respectively.

However, those skilled in the art will readily appreciate that in other embodiments, different polynomials (or a combination of the above same and different polynomials) may be used for the rate 1/6 tail biting convolution coding.

Multi-Frame Mapping

Figure 5:
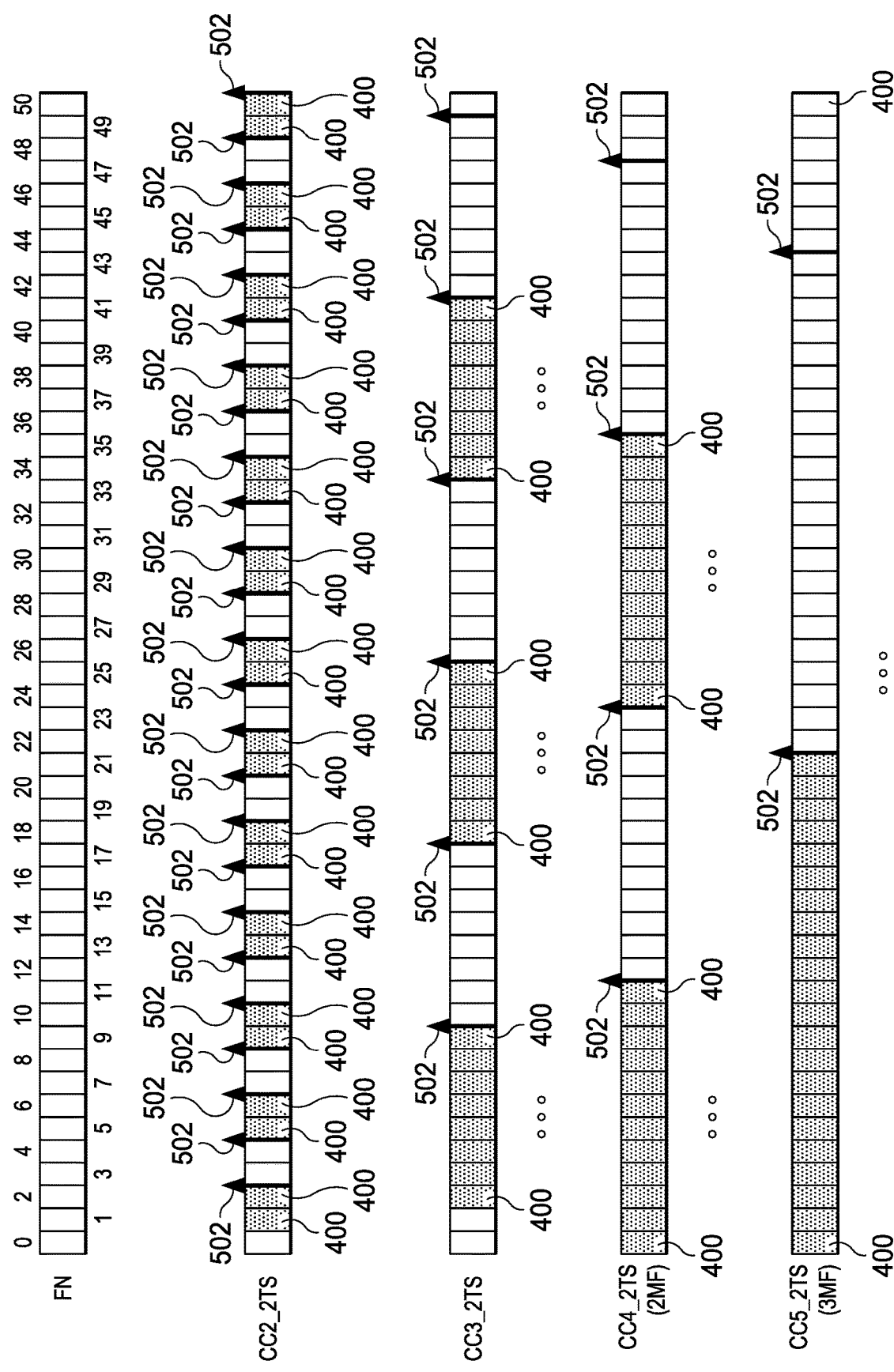
FIG. 5 is a diagram illustrating an exemplary 2TS EC-RACH mapping for CC2_2TS, CC3_2TS, CC4_2TS (2MF), and CC5_2TS (3MF) in accordance with an embodiment of the present disclosure.

As is illustrated in FIG. 5, the new EC-RACH CC5 concept involves the transmission of 22 repeated ESABs 400 over 3 consecutive 51-MFs, i.e., 66 repeated ESABs in total will be transmitted per access attempt, where each ESAB 400 occupies the space of 2 legacy access bursts and wherein the guard period 408 (i.e., the 68 guard symbols) in the latter part of the ESAB 400 (i.e., the part that corresponds to the second of the two legacy access bursts used for formulating the ESAB 400) is kept the same.

Further, as can be seen in FIG. 5, no coincidental blind detection points occur for coverage classes 2/3/4/5 (CC2/3/4/5) (note: in this example, CC5 is based on ESAB 400) based access attempts on the EC-RACH since there is at most only 1 CC-specific demodulation point (i.e., as indicated by the black arrows 502) corresponding to any given access attempt. In other words, only a single demodulation attempt is required at each of these CC-specific demodulation points.

Basically, the 2TS EC-RACH mapping shown in FIG. 5, which illustrates only TDMA frames and the last 51-MF used for sending a ESAB 400 when there are actually 2TSs per TDMA frame and 3 consecutive 51-MFs used for sending a ESAB 400, indicates the following:

- CC2_2TS: 2 consecutive rectangles (TDMA frames) in a single 51-multiframe are sent for a CC2 2TS EC-RACH access=4 access bursts (2 per TDMA frame)=2 ESAB bursts 400 (1 per TDMA frame).
- CC3_2TS: 8 consecutive rectangles (TDMA frames) in a single 51-multiframe are sent for a CC3 2TS EC-RACH access=16 access bursts (2 per TDMA frame)=8 ESAB bursts 400 (1 per TDMA frame).
- CC4_2 TS (2MF): 24 rectangles (TDMA frames) are sent using two instances of 12 consecutive rectangles occurring in 2 consecutive 51-multiframes for a CC4 2TS EC-RACH access=48 access bursts (2 per TDMA frame)=24 ESAB bursts 400 (1 per TDMA frame). For instance, the first set of 12 consecutive rectangles in 51-multiframe X and the first set of 12 consecutive rectangles in 51-multiframe X+1=the resources used for a CC4 2TS EC-RACH access.
- CC5_2TS (3MF): 66 rectangles (TDMA frames) are sent using three instances of 22 consecutive rectangles occurring in 3 consecutive 51-multiframes for a CC5 2TS EC-RACH access=132 access bursts (2 per TDMA frame)=66 ESAB bursts (1 per TDMA frame). For instance, the first set of 22 consecutive rectangles in 51-multiframe X, the first set of 22 consecutive rectangles in 51-multiframe X+1, and the first set of 22 consecutive rectangles in 51-multiframe X+2=the resources used for a CC5 2TS EC-RACH access.

Performance

The comparative sensitivity performance of CC5 2TS EC-RACH/66 channel (see FIG. 5's CC5 2TS (3MF)) against CC4 2TS EC-RACH/48 channel (see FIG. 5's CC4_2 TS (2MF)) is indicated in the following TABLE 3. The performance of the prior art CC5 2TS EC-RACH'/75 in Tdoc R6-160176 (see reference above) is also included for comparison purposes in the TABLE 3.

TABLE 3

Sensitivity Performance for CC5 2TS
EC-RACH/66 and CC4 2 TS EC-RACH/48

| Channel type | TU1.2nFH [dBm] | Comparative gain [dB] |
|---|---|---|
| CC4 2TS EC-RACH/48 | −128.0 | — |
| CC5 2TS EC-RACH'/75 * | −132.0 | 4.0 |
| CC5 2TS EC-RACH/66 (ESAB + RACH11') | −133.1 | 5.1 |

* Tdoc R6-160176 (see reference above)

It is to be noted that in the simulation for CC5 2TS EC-RACH/66, a temporary Training Sequence Code (TSC) was used via concatenation of the TSC bits from TSC4/TSC5/TSC6/TSC7 to the length of 140 bits. The TSC4/TSC5/TSC6/TSC7 are defined in Release 13 (R13) of 3GPP TS 45.002 (see reference above).

When comparing the CC5 2TS EC-RACH/66 with the proposed solution CC5 2TS EC-RACH'/75 in Tdoc R6-160193 and Tdoc R6-160176 (see references above), the CC5 2TS EC-RACH/66 has the following benefits:

- A 1.1 dB higher performance gain for TU1.2 sensitivity case (5.1 dB vs. 4.0 dB);
- 12% lower power consumption per RACH attempt due to a lower number of sent bursts (132 bursts vs. 150 bursts);
- 1 more information data bit can be used for the future (11 bits vs. 10 bits); and
- Simpler IQ accumulator in BTS receiver since only one data part is used in each burst pair (TS0 and TS1) and no multiple demodulations at each demodulation positions.

Basic Functionalities-Configurations of Wireless Device $304_1$ (for Example) and RAN Node $302_1$ (for Example)

Figure 6:
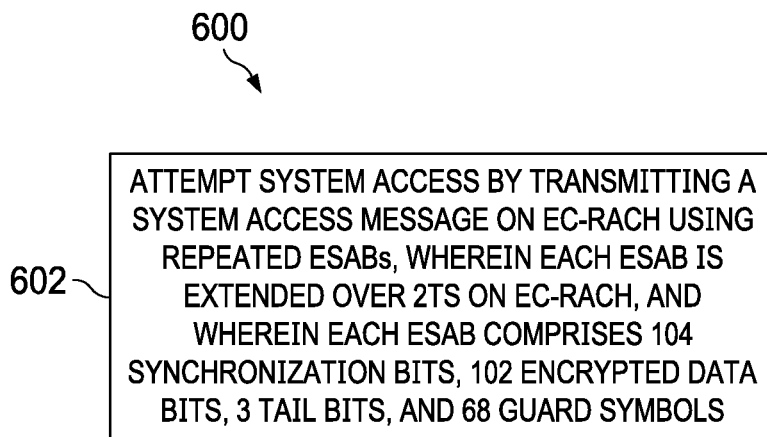
FIG. 6 is a flowchart of a method implemented in the wireless device in accordance with an embodiment of the present disclosure.

Referring to FIG. 6, there is a flowchart of a method 600 implemented in the wireless device $304_1$ which is configured to communicate with the RAN node $302_1$ in accordance with an embodiment of the present disclosure. At step 602, the wireless device $304_1$ attempts a system access using an EC-RACH 603 by transmitting, to the RAN node $302_1$, a system access message 605 on the EC-RACH 603 using repeated ESABs 400, wherein each ESAB 400 is extended over 2 timeslots on the EC-RACH 603, and wherein each ESAB 400 comprises 140 synchronization bits 402, 102 encrypted data bits 404, 3 tail bits 406, and 68 guard symbols 408. In one embodiment, each ESAB 400 has the 102 encrypted data bits 404 which are coded according to an 11-bit RACH coding scheme which utilizes 11 payload bits and 6 parity bits to which a rate 1/6 tail biting convolutional coding is applied, resulting in the 102 encrypted data bits 404 after channel coding. The rate 1/6 tail biting convolutional coding utilizes the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In another embodiment, the transmitting of the system access message 605 takes place on the EC-RACH 603 which is in a 2 timeslot (2TS) and coverage class 5 (CC5) operation and involves transmitting 22 repeated ESABs 400 over three consecutive 51-Multi-Frames (MFs) for a total of 66 repeated ESABs 400.

Figure 7:
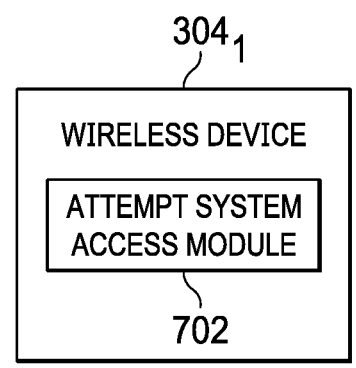
FIG. 7 is a block diagram illustrating a structure of the wireless device configured in accordance with an embodiment of the present disclosure.

Referring to FIG. 7, there is a block diagram illustrating structures of an exemplary wireless device $304_1$ configured in accordance with an embodiment of the present disclosure. In one embodiment, the wireless device $304_1$ comprises an attempt system access module 702 that is configured to transmit, to the RAN node $302_1$, a system access message 605 on the EC-RACH 603 using repeated ESABs 400, wherein each ESAB 400 is extended over 2 timeslots on the EC-RACH 603, and wherein each ESAB 400 comprises 140 synchronization bits 402, 102 encrypted data bits 404, 3 tail bits 406, and 68 guard symbols 408. In one embodiment, each ESAB 400 has the 102 encrypted data bits 404 which are coded according to an 11-bit RACH coding scheme which utilizes 11 payload bits and 6 parity bits to which a rate 1/6 tail biting convolutional coding is applied, resulting in the 102 encrypted data bits 404 after channel coding. The rate 1/6 tail biting convolutional coding utilizes the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In another embodiment, the transmitting of the system access message 605 takes place on the EC-RACH 603 which is in a 2 timeslot (2TS) and coverage class 5 (CC5) operation and involves transmitting 22 repeated ESABs 400 over three consecutive 51-Multi-Frames (MFs) for a total of 66 repeated ESABs 400. In addition, it should be noted that the wireless device $304_1$ may also include other components, modules or structures which are well-known, but for clarity, only the components, modules or structures needed to describe the features of the present disclosure are described herein.

As those skilled in the art will appreciate, the above-described module 702 of the wireless device $304_1$ may be implemented as suitable dedicated circuit. Further, the module 702 can also be implemented using any number of dedicated circuits through functional combination or separation. In some embodiments, the module 702 may be even combined in a single application specific integrated circuit (ASIC). As an alternative software-based implementation, the wireless device $304_1$ may comprise a memory $320_1$, a processor $318_1$ (including but not limited to a microprocessor, a microcontroller or a Digital Signal Processor (DSP), etc.) and a transceiver $310_1$. The memory $320_1$ stores machine-readable program code executable by the processor $318_1$ to cause the wireless device $304_1$ to perform the step of the above-described method 600. Note: the other wireless device $304_2$, $304_3$ ... $304_n$ may be configured the same as wireless device $304_1$.

Figure 8:
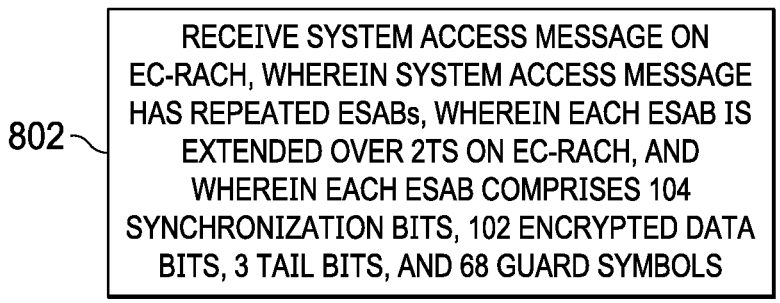
FIG. 8 is a flowchart of a method implemented in the RAN node in accordance with an embodiment of the present disclosure.

Referring to FIG. 8, there is a flowchart of a method 800 implemented in the RAN node $302_1$ which is configured to interact with the wireless device $304_1$ in accordance with an embodiment of the present disclosure. At step 802, the RAN node $302_1$ receives, from the wireless device $304_1$, a system access message 605 on an EC-RACH 603, wherein the system access message 605 has repeated ESABs 400, wherein each ESAB 400 is extended over 2 timeslots on the EC-RACH 603, and wherein each ESAB 400 comprises 140 synchronization bits 402, 102 encrypted data bits 404, 3 tail bits 406, and 68 guard symbols 408. In one embodiment, each ESAB 400 has the 102 encrypted data bits 404 which were coded according to an 11-bit RACH coding scheme which utilized 11 payload bits and 6 parity bits to which a rate 1/6 tail biting convolutional coding was applied, resulting in the 102 encrypted data bits 404 after channel coding. The rate 1/6 tail biting convolutional coding utilized the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In another embodiment, the receiving of the system access message 605 takes place on the EC-RACH 603 which is in a 2 timeslot (2TS) and coverage class 5 (CC5) operation and involves receiving 22 repeated ESABs 400 over three consecutive 51-Multi-Frames (MFs) for a total of 66 repeated ESABs 400.

Figure 9:
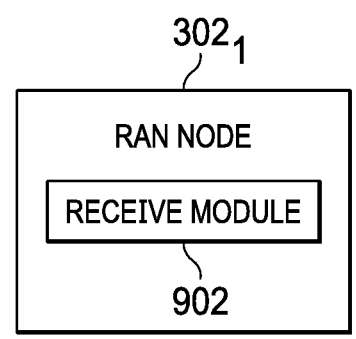
FIG. 9 is a block diagram illustrating a structure of the RAN node configured in accordance with an embodiment of the present disclosure.

Referring to FIG. 9, there is a block diagram illustrating structures of an exemplary RAN node $302_1$ configured in accordance with an embodiment of the present disclosure. In one embodiment, the RAN node $302_1$ comprises a receive module 902 that is configured to receive, from the wireless device $304_1$, a system access message 605 on an EC-RACH 603, wherein the system access message 605 has repeated ESABs 400, wherein each ESAB 400 is extended over 2 timeslots on the EC-RACH 603, and wherein each ESAB 400 comprises 140 synchronization bits 402, 102 encrypted data bits 404, 3 tail bits 406, and 68 guard symbols 408. In one embodiment, each ESAB 400 has the 102 encrypted data bits 404 which were coded according to an 11-bit RACH coding scheme which utilized 11 payload bits and 6 parity bits to which a rate 1/6 tail biting convolutional coding was applied, resulting in the 102 encrypted data bits 404 after channel coding. The rate 1/6 tail biting convolutional coding utilized the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In another embodiment, the receiving of the system access message 605 takes place on the EC-RACH 603 which is in a 2 timeslot (2TS) and coverage class 5 (CC5) operation and involves receiving 22 repeated ESABs 400 over three consecutive 51-Multi-Frames (MFs) for a total of 66 repeated ESABs 400. In addition, it should be noted that the RAN node $302_1$ may also include other components, modules or structures which are well-known, but for clarity, only the components, modules or structures needed to describe the features of the present disclosure are described herein.

As those skilled in the art will appreciate, the above-described module 902 of the RAN node $302_1$ may be implemented as suitable dedicated circuit. Further, the module 902 can also be implemented using any number of dedicated circuits through functional combination or separation. In some embodiments, the module 902 may be even combined in a single application specific integrated circuit (ASIC). As an alternative software-based implementation, the RAN node $302_1$ may comprise a memory $334_1$, a processor $332_1$ (including but not limited to a microprocessor, a microcontroller or a Digital Signal Processor (DSP), etc.) and a transceiver $322_1$. The memory $334_1$ stores machine-readable program code executable by the processor $332_1$ to cause the RAN node $302_1$ to perform the step of the above-described method 800. Note: the other RAN node $302_2$ may be configured the same as RAN node $302_1$.

Figure 10:
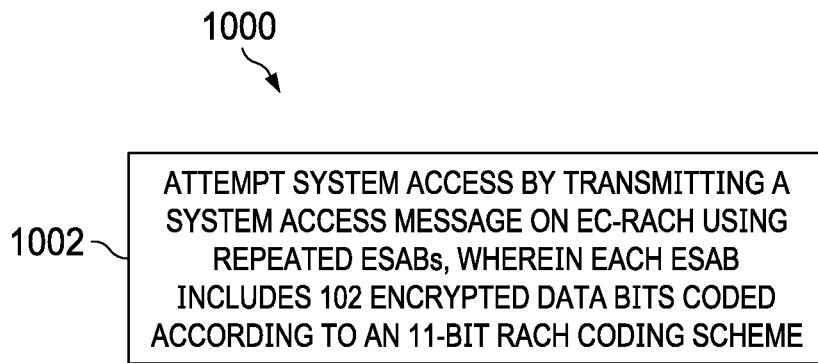
FIG. 10 is a flowchart of a method implemented in the wireless device in accordance with an embodiment of the present disclosure.

Referring to FIG. 10, there is a flowchart of a method 1000 implemented in the wireless device $304_1$ which is configured to communicate with the RAN node $302_1$ in accordance with an embodiment of the present disclosure. At step 1002, the wireless device $304_1$ attempts a system access using an EC-RACH 603 by transmitting, to the RAN node, a system access message 605 on the EC-RACH 603 using repeated ESABs 400, wherein each ESAB 400 includes 102 encrypted data bits 404 coded according to an 11-bit RACH coding scheme which utilizes 11 payload bits and 6 parity bits to which a rate 1/6 tail biting convolutional coding is applied, resulting in the 102 encrypted data bits 404 after channel coding. In one embodiment, the rate 1/6 tail biting convolutional coding utilizes the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In one embodiment, each ESAB 400 is extended over 2 timeslots on the EC-RACH 603, and each ESAB 400 comprises 140 synchronization bits 402, the 102 encrypted data bits 404, 3 tail bits 406, and 68 guard symbols (408). In another embodiment, the transmitting of the system access message 605 on the EC-RACH 603 is performed when the EC-RACH 603 is in a 2 timeslot (2TS) and coverage class 5 (CC5) operation and involves transmitting 22 repeated ESABs 400 over three consecutive 51-Multi-Frames (MFs) for a total of 66 repeated ESABs 400.

Figure 11:
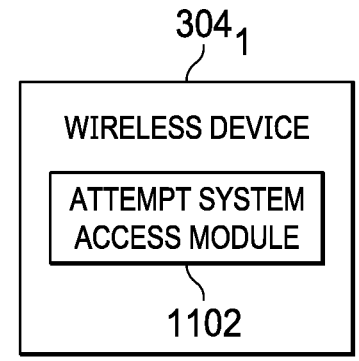
FIG. 11 is a block diagram illustrating a structure of the wireless device configured in accordance with an embodiment of the present disclosure.

Referring to FIG. 11, there is a block diagram illustrating structures of an exemplary wireless device $304_1$ configured in accordance with an embodiment of the present disclosure. In one embodiment, the wireless device $304_1$ comprises an attempt system access module 1102 that is configured to transmit, to the RAN node $302_1$, a system access message 605 on the EC-RACH 603 using repeated ESABs 400, wherein each ESAB 400 includes 102 encrypted data bits 404 coded according to an 11-bit RACH coding scheme which utilizes 11 payload bits and 6 parity bits to which a rate 1/6 tail biting convolutional coding is applied, resulting in the 102 encrypted data bits 404 after channel coding. In one embodiment, the rate 1/6 tail biting convolutional coding utilizes the following polynomials: G4=1+D2+D3+D5+

D6; G4=1+D2+D3+D5+D6; G7=1+D+D2+D3+D6; G5=1+D+D4+D6; G6=1+D+D2+D3+D4+D6; and G6=1+D+D2+D3+D4+D6. In one embodiment, each ESAB 400 is extended over 2 timeslots on the EC-RACH 603, and each ESAB 400 comprises 140 synchronization bits 402, the 102 encrypted data bits 404, 3 tail bits 406, and 68 guard symbols (408). In another embodiment, the transmitting of the system access message 605 on the EC-RACH 603 is performed when the EC-RACH 603 is in a 2 timeslot (2TS) and coverage class 5 (CC5) operation and involves transmitting 22 repeated ESABs 400 over three consecutive 51-Multi-Frames (MFs) for a total of 66 repeated ESABs 400. In addition, it should be noted that the wireless device 304$_1$ may also include other components, modules or structures which are well-known, but for clarity, only the components, modules or structures needed to describe the features of the present disclosure are described herein.

As those skilled in the art will appreciate, the above-described module 1102 of the wireless device 304$_1$ may be implemented as suitable dedicated circuit. Further, the module 1102 can also be implemented using any number of dedicated circuits through functional combination or separation. In some embodiments, the module 1102 may be even combined in a single application specific integrated circuit (ASIC). As an alternative software-based implementation, the wireless device 304$_1$ may comprise a memory 320$_1$, a processor 318$_1$ (including but not limited to a microprocessor, a microcontroller or a Digital Signal Processor (DSP), etc.) and a transceiver 310$_1$. The memory 320$_1$ stores machine-readable program code executable by the processor 318$_1$ to cause the wireless device 304$_1$ to perform the step of the above-described method 1000. Note: the other wireless device 304$_2$, 304$_3$ . . . 304$_n$ may be configured the same as wireless device 304$_1$.

Figure 12:
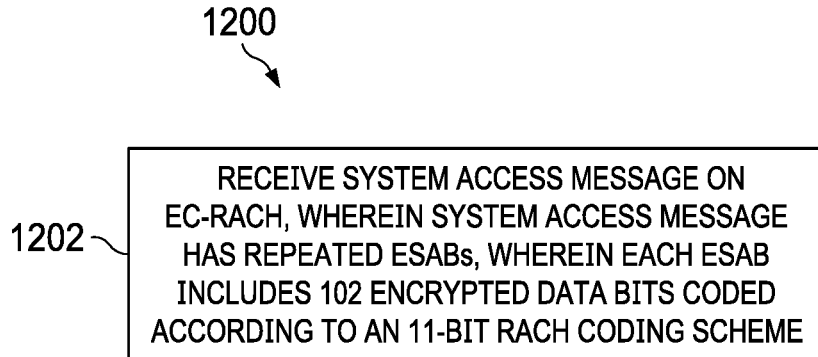
FIG. 12 is a flowchart of a method implemented in the RAN node in accordance with an embodiment of the present disclosure.

Referring to FIG. 12, there is a flowchart of a method 1200 implemented in the RAN node 302$_1$ which is configured to interact with the wireless device 304$_1$ in accordance with an embodiment of the present disclosure. At step 1202, the RAN node 302$_1$ receives, from the wireless device 304$_1$, a system access message 605 on the EC-RACH 603 which has repeated ESABs 400, wherein each ESAB 400 includes 102 encrypted data bits 404 coded according to an 11-bit RACH coding scheme which utilized 11 payload bits and 6 parity bits to which a rate 1/6 tail biting convolutional coding was applied, resulting in the 102 encrypted data bits 404 after channel coding. In one embodiment, the rate 1/6 tail biting convolutional coding utilized the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In another embodiment, each ESAB 400 was extended over 2 timeslots on the EC-RACH 603, and each ESAB 400 comprises 140 synchronization bits 402, the 102 encrypted data bits 404, 3 tail bits 406, and 68 guard symbols 408. In another embodiment, the receiving of the system access message 605 on the EC-RACH 603 is performed when the EC-RACH 603 is in a 2 timeslot (2TS) and coverage class 5 (CC5) operation and involved receiving 22 repeated ESABs 400 over three consecutive 51-Multi-Frames (MFs) for a total of 66 repeated ESABs 400.

Figure 13:
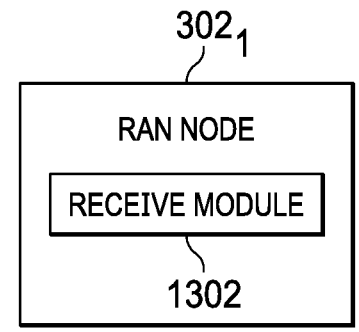
FIG. 13 is a block diagram illustrating a structure of the RAN node configured in accordance with an embodiment of the present disclosure.

Referring to FIG. 13, there is a block diagram illustrating structures of an exemplary RAN node 302$_1$ configured in accordance with an embodiment of the present disclosure. In one embodiment, the RAN node 302$_1$ comprises a receive module 1302 that is configured to receive, from the wireless device 304$_1$, a system access message 605 on the EC-RACH 603 which has repeated ESABs 400, wherein each ESAB 400 includes 102 encrypted data bits 404 coded according to an 11-bit RACH coding scheme which utilized 11 payload bits and 6 parity bits to which a rate 1/6 tail biting convolutional coding was applied, resulting in the 102 encrypted data bits 404 after channel coding. In one embodiment, the rate 1/6 tail biting convolutional coding utilized the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In one embodiment, each ESAB 400 was extended over 2 timeslots on the EC-RACH 603, and each ESAB 400 comprises 140 synchronization bits 402, the 102 encrypted data bits 404, 3 tail bits 406, and 68 guard symbols 408. In another embodiment, the receiving of the system access message 605 on the EC-RACH 603 was performed when the EC-RACH 603 is in a 2 timeslot (2TS) and coverage class 5 (CC5) operation and involved receiving 22 repeated ESABs 400 over three consecutive 51-Multi-Frames (MFs) for a total of 66 repeated ESABs 400. In addition, it should be noted that the RAN node 302$_1$ may also include other components, modules or structures which are well-known, but for clarity, only the components, modules or structures needed to describe the features of the present disclosure are described herein.

As those skilled in the art will appreciate, the above-described module 1302 of the RAN node 302$_1$ may be implemented as suitable dedicated circuit. Further, the module 1302 can also be implemented using any number of dedicated circuits through functional combination or separation. In some embodiments, the module 1302 may be even combined in a single application specific integrated circuit (ASIC). As an alternative software-based implementation, the RAN node 302$_1$ may comprise a memory 334$_1$, a processor 332$_1$ (including but not limited to a microprocessor, a microcontroller or a Digital Signal Processor (DSP), etc.) and a transceiver 322$_1$. The memory 334$_1$ stores machine-readable program code executable by the processor 332$_1$ to cause the RAN node 302$_1$ to perform the step of the above-described method 1200. Note: the other RAN node 302$_2$ may be configured the same as RAN node 302$_1$.

Figure 14:
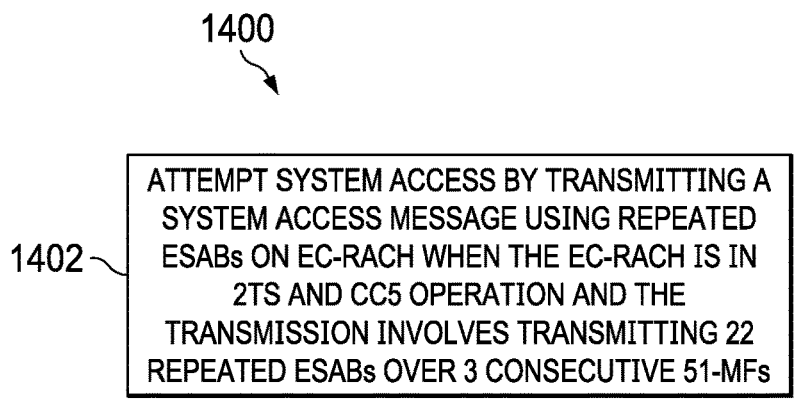
FIG. 14 is a flowchart of a method implemented in the wireless device in accordance with an embodiment of the present disclosure.

Referring to FIG. 14, there is a flowchart of a method 1400 implemented in the wireless device 304$_1$ which is configured to communicate with the RAN node 302$_1$ in accordance with an embodiment of the present disclosure. At step 1402, the wireless device 304$_1$ attempts a system access using an EC-RACH 603 by transmitting, to the RAN node, a system access message 605 which has repeated ESABs 400 on the EC-RACH 603, wherein the transmitting of the system access message 605 on the EC-RACH 603 is performed when the EC-RACH 603 is in a 2 timeslot (2TS) and coverage class 5 (CC5) operation and involves transmitting 22 repeated ESABs 400 over three consecutive 51-Multi-Frames (MFs) for a total of 66 repeated ESABs 400. In one embodiment, each ESAB 400 is extended over 2 timeslots on the EC-RACH 603, and each ESAB 400 comprises 140 synchronization bits 402, 102 encrypted data bits 404, 3 tail bits 406, and 68 guard symbols 408. In one embodiment, each ESAB 400 has the 102 encrypted data bits 404 which are coded according to an 11-bit RACH coding scheme which utilizes 11 payload bits and 6 parity bits to which a rate 1/6 tail biting convolutional coding is applied, resulting in the 102 encrypted data bits 404 after channel coding. The rate 1/6 tail biting convolutional coding utilizes the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6.

Figure 15:
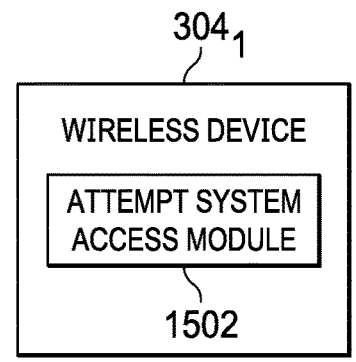
FIG. 15 is a block diagram illustrating a structure of the wireless device configured in accordance with an embodiment of the present disclosure.

Referring to FIG. 15, there is a block diagram illustrating structures of an exemplary wireless device $304_1$ configured in accordance with an embodiment of the present disclosure. In one embodiment, the wireless device $304_1$ comprises an attempt system access module 1502 that is configured to transmit, to the RAN node $302_1$, a system access message 605 which has repeated ESABs 400 on the EC-RACH 603, wherein the transmitting of the system access message 605 on the EC-RACH 603 is performed when the EC-RACH 603 is in a 2 timeslot (2TS) and coverage class 5 (CC5) operation and involves transmitting 22 repeated ESABs 400 over three consecutive 51-Multi-Frames (MFs) for a total of 66 repeated ESABs 400. In one embodiment, each ESAB 400 is extended over 2 timeslots on the EC-RACH 603, and each ESAB 400 comprises 140 synchronization bits 402, 102 encrypted data bits 404, 3 tail bits 406, and 68 guard symbols 408. In one embodiment, each ESAB 400 has the 102 encrypted data bits 404 which are coded according to an 11-bit RACH coding scheme which utilizes 11 payload bits and 6 parity bits to which a rate 1/6 tail biting convolutional coding is applied, resulting in the 102 encrypted data bits 404 after channel coding. The rate 1/6 tail biting convolutional coding utilizes the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In addition, it should be noted that the wireless device $304_1$ may also include other components, modules or structures which are well-known, but for clarity, only the components, modules or structures needed to describe the features of the present disclosure are described herein.

As those skilled in the art will appreciate, the above-described module 1502 of the wireless device $304_1$ may be implemented as suitable dedicated circuit. Further, the module 1502 can also be implemented using any number of dedicated circuits through functional combination or separation. In some embodiments, the module 1502 may be even combined in a single application specific integrated circuit (ASIC). As an alternative software-based implementation, the wireless device $304_1$ may comprise a memory $320_1$, a processor $318_1$ (including but not limited to a microprocessor, a microcontroller or a Digital Signal Processor (DSP), etc.) and a transceiver $310_1$. The memory $320_1$ stores machine-readable program code executable by the processor $318_1$ to cause the wireless device $304_1$ to perform the step of the above-described method 1400. Note: the other wireless device $304_2$, $304_3$ . . . $304_n$ may be configured the same as wireless device $304_1$.

Figure 16:
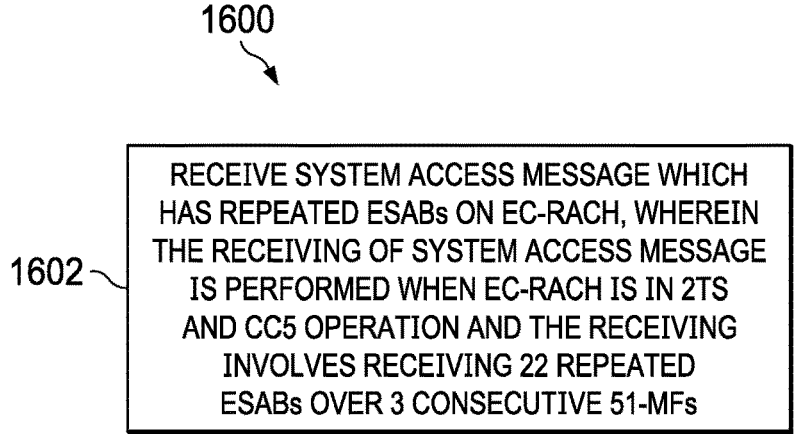
FIG. 16 is a flowchart of a method implemented in the RAN node in accordance with an embodiment of the present disclosure; and, FIG. 17 is a block diagram illustrating a structure of the RAN node configured in accordance with an embodiment of the present disclosure.

Referring to FIG. 16, there is a flowchart of a method 1600 implemented in the RAN node $302_1$ which is configured to interact with the wireless device $304_1$ in accordance with an embodiment of the present disclosure. At step 1602, the RAN node $302_1$ receives, from the wireless device $304_1$, a system access message 605 which has repeated ESABs 400 on the EC-RACH 603, wherein the receiving of the system access message 605 on the EC-RACH 603 is performed when the EC-RACH 603 is in a 2 timeslot (2TS) and coverage class 5 (CC5) operation and involves receiving 22 repeated ESABs 400 over three consecutive 51-Multi-Frames (MFs) for a total of 66 repeated ESABs 400. In one embodiment, each ESAB 400 is extended over 2 timeslots on the EC-RACH 603, and each ESAB 400 comprises 140 synchronization bits 402, 102 encrypted data bits 404, 3 tail bits 406, and 68 guard symbols 408. In one embodiment, each ESAB 400 has the 102 encrypted data bits 404 which were coded according to an 11-bit RACH coding scheme which utilized 11 payload bits and 6 parity bits to which a rate 1/6 tail biting convolutional coding was applied, resulting in the 102 encrypted data bits 404 after channel coding. The rate 1/6 tail biting convolutional coding utilized the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6.

Figure 17:
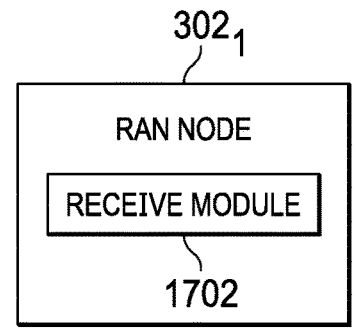

Referring to FIG. 17, there is a block diagram illustrating structures of an exemplary RAN node $302_1$ configured in accordance with an embodiment of the present disclosure. In one embodiment, the RAN node $302_1$ comprises a receive module 1702 that is configured to receive, from the wireless device $304_1$, a system access message 605 which has repeated ESABs 400 on the EC-RACH 603, wherein the receiving of the system access message 605 on the EC-RACH 603 is performed when the EC-RACH 603 is in a 2 timeslot (2TS) and coverage class 5 (CC5) operation and involves receiving 22 repeated ESABs 400 over three consecutive 51-Multi-Frames (MFs) for a total of 66 repeated ESABs 400. In one embodiment, each ESAB 400 is extended over 2 timeslots on the EC-RACH 603, and each ESAB 400 comprises 140 synchronization bits 402, 102 encrypted data bits 404, 3 tail bits 406, and 68 guard symbols 408. In one embodiment, each ESAB 400 has the 102 encrypted data bits 404 which were coded according to an 11-bit RACH coding scheme which utilized 11 payload bits and 6 parity bits to which a rate 1/6 tail biting convolutional coding was applied, resulting in the 102 encrypted data bits 404 after channel coding. The rate 1/6 tail biting convolutional coding utilized the following polynomials: G4=1+D2+D3+D5+D6; G4=1+D2+D3+D5+D6; G7=1+D+D2+D3+D6; G5=1+D+D4+D6; G6=1+D+D2+D3+D4+D6; and G6=1+D+D2+D3+D4+D6. In addition, it should be noted that the RAN node $302_1$ may also include other components, modules or structures which are well-known, but for clarity, only the components, modules or structures needed to describe the features of the present disclosure are described herein.

As those skilled in the art will appreciate, the above-described module 1702 of the RAN node $302_1$ may be implemented as suitable dedicated circuit. Further, the module 1702 can also be implemented using any number of dedicated circuits through functional combination or separation. In some embodiments, the module 1702 may be even combined in a single application specific integrated circuit (ASIC). As an alternative software-based implementation, the RAN node $302_1$ may comprise a memory $334_1$, a processor $332_1$ (including but not limited to a microprocessor, a microcontroller or a Digital Signal Processor (DSP), etc.) and a transceiver $322_1$. The memory $334_1$ stores machine-readable program code executable by the processor $332_1$ to cause the RAN node $302_1$ to perform the step of the above-described method 1600. Note: the other RAN node $302_2$ may be configured the same as RAN node $302_1$.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A wireless device configured to communicate with a Radio Access Network (RAN) node, the wireless device comprising:
   a processor; and,
   a memory that stores processor-executable instructions, wherein the processor interfaces with the memory to execute the processor-executable instructions, whereby the wireless device is operable to:
      attempt a system access using an Extended Coverage Random Access Channel (EC-RACH) by transmitting, to the RAN node, a system access message on the EC-RACH using repeated Extended Synchronization Access Bursts (ESABs), wherein each ESAB has 102 encrypted data bits coded according to an 11-bit Random Access Channel (RACH) coding scheme which utilizes 11 payload bits and 6 parity bits to which a rate 1/6 tail biting convolutional coding is applied resulting in the 102 encrypted data bits after channel coding.

2. The wireless device of claim 1, wherein each ESAB comprises 140 synchronization bits, the 102 encrypted data bits, 3 tail bits, and 68 guard symbols.

3. The wireless device of claim 1, wherein the rate 1/6 tail biting convolutional coding utilizes the following polynomials:

$$G4=1+D2+D3+D5+D6;$$

$$G4=1+D2+D3+D5+D6;$$

$$G7=1+D+D2+D3+D6;$$

$$G5=1+D+D4+D6;$$

$$G6=1+D+D2+D3+D4+D6; \text{ and}$$

$$G6=1+D+D2+D3+D4+D6.$$

4. The wireless device of claim 1, wherein the transmitting of the system access message on the EC-RACH is performed when the EC-RACH is in a 2 timeslot (2TS) and coverage class 5 (CC5) operation and involves transmitting 22 repeated ESABs over three consecutive 51-Multi-Frames (MFs) for a total of 66 repeated ESABs.

5. The wireless device of claim 1, wherein each ESAB is extended over 2 timeslots on the EC-RACH.

6. A method implemented by a wireless device configured to communicate with a Radio Access Network (RAN) node, the method comprising:
   attempting a system access using an Extended Coverage Random Access Channel (EC-RACH) by transmitting, to the RAN node, a system access message on the EC-RACH using repeated Extended Synchronization Access Bursts (ESABs), wherein each ESAB has 102 encrypted data bits coded according to an 11-bit Random Access Channel (RACH) coding scheme which utilizes 11 payload bits and 6 parity bits to which a rate 1/6 tail biting convolutional coding is applied, resulting in the 102 encrypted data bits after channel coding.

7. The method of claim 6, wherein each ESAB comprises 140 synchronization bits, the 102 encrypted data bits, 3 tail bits, and 68 guard symbols.

8. The method of claim 6, wherein the rate 1/6 tail biting convolutional coding utilizes the following polynomials:

$$G4=1+D2+D3+D5+D6;$$

$$G4=1+D2+D3+D5+D6;$$

$$G7=1+D+D2+D3+D6;$$

$$G5=1+D+D4+D6;$$

$$G6=1+D+D2+D3+D4+D6; \text{ and}$$

$$G6=1+D+D2+D3+D4+D6.$$

9. The method of claim 6, wherein the transmitting of the system access message on the EC-RACH is performed when the EC-RACH is in a 2 timeslot (2TS) and coverage class 5 (CC5) operation and involves transmitting 22 repeated ESABs over three consecutive 51-Multi-Frames (MFs) for a total of 66 repeated ESABs.

10. The method of claim 6, wherein each ESAB is extended over 2 timeslots on the EC-RACH.

11. A Radio Access Network (RAN) node configured to interact with a wireless device, the RAN node comprising:
   a processor; and,
   a memory that stores processor-executable instructions, wherein the processor interfaces with the memory to execute the processor-executable instructions, whereby the RAN node is operable to:
      receive, from the wireless device, a system access message on an Extended Coverage Random Access Channel (EC-RACH), wherein the system access message comprises repeated Extended Synchronization Access Bursts (ESABs), wherein each ESAB has 102 encrypted data bits coded according to an 11-bit Random Access Channel (RACH) coding scheme which utilized 11 payload bits and 6 parity bits to which a rate 1/6 tail biting convolutional coding was applied, resulting in the 102 encrypted data bits after channel coding.

12. The RAN node of claim 11, wherein each ESAB comprises 140 synchronization bits, the 102 encrypted data bits, 3 tail bits, and 68 guard symbols.

13. The RAN node of claim 11, wherein the rate 1/6 tail biting convolutional coding utilized the following polynomials:

$$G4=1+D2+D3+D5+D6;$$

$$G4=1+D2+D3+D5+D6;$$

$$G7=1+D+D2+D3+D6;$$

$$G5=1+D+D4+D6;$$

$$G6=1+D+D2+D3+D4+D6; \text{ and}$$

$$G6=1+D+D2+D3+D4+D6.$$

14. The RAN node of claim 11, wherein the receiving of the system access message on the EC-RACH is done when the EC-RACH is in a 2 timeslot (2TS) and coverage class 5 (CC5) operation and involves receiving 22 repeated ESABs over three consecutive 51-Multi-Frames (MFs) for a total of 66 repeated ESABs.

15. The RAN node of claim 11, wherein each ESAB is extended over 2 timeslots on the EC-RACH.

16. A method implemented by a Radio Access Network (RAN) node configured to interact with a wireless device, the method comprising:
receiving, from the wireless device, a system access message on an Extended Coverage Random Access Channel (EC-RACH), wherein the system access message comprises repeated Extended Synchronization Access Bursts (ESABs), wherein each ESAB has 102 encrypted data bits coded according to an 11-bit Random Access Channel (RACH) coding scheme which utilized 11 payload bits and 6 parity bits to which a rate 1/6 tail biting convolutional coding was applied, resulting in the 102 encrypted data bits after channel coding.

17. The method of claim 16, wherein each ESAB comprises 140 synchronization bits, the 102 encrypted data bits, 3 tail bits, and 68 guard symbols.

18. The method of claim 16, wherein the rate 1/6 tail biting convolutional coding utilized the following polynomials:

$$G4=1+D2+D3+D5+D6;$$

$$G4=1+D2+D3+D5+D6;$$

$$G7=1+D+D2+D3+D6;$$

$$G5=1+D+D4+D6;$$

$$G6=1+D+D2+D3+D4+D6; \text{ and}$$

$$G6=1+D+D2+D3+D4+D6.$$

19. The method of claim 16, wherein the receiving of the system access message on the EC-RACH is done when the EC-RACH is in a 2 timeslot (2TS) and coverage class 5 (CC5) operation and involves receiving 22 repeated ESABs over three consecutive 51-Multi-Frames (MFs) for a total of 66 repeated ESABs.

20. The method of claim 16, wherein each ESAB is extended over 2 timeslots on the EC-RACH.

* * * * *